(12) United States Patent
Nagarkar et al.

(10) Patent No.: US 7,802,302 B1
(45) Date of Patent: *Sep. 21, 2010

(54) SINGLE SCAN FOR A BASE MACHINE AND ALL ASSOCIATED VIRTUAL MACHINES

(75) Inventors: Kuldeep Sureshrao Nagarkar, Pune (IN); Sinh Dang Nguyen, Eden Prairie, MN (US); Ajay Sadashiv Wani, Pune (IN)

(73) Assignee: Symantec Corporation, Mountain View, CA (US)

( * ) Notice: Subject to any disclaimer, the term of this patent is extended or adjusted under 35 U.S.C. 154(b) by 1228 days.

This patent is subject to a terminal disclaimer.

(21) Appl. No.: 11/373,735

(22) Filed: Mar. 10, 2006

(51) Int. Cl.
*G06F 21/06* (2006.01)

(52) U.S. Cl. .............................. 726/24; 711/6; 711/161; 711/162

(58) Field of Classification Search .................. None
See application file for complete search history.

(56) References Cited

U.S. PATENT DOCUMENTS

| | | | |
|---|---|---|---|
| 6,757,778 B1 | 6/2004 | van Rietschote | |
| 6,981,114 B1 * | 12/2005 | Wu et al. ................ | 711/162 |
| 7,093,086 B1 | 8/2006 | van Rietschote | |
| 7,266,637 B1 | 9/2007 | van Rietschote | |
| 7,370,164 B1 * | 5/2008 | Nagarkar et al. ........... | 711/162 |
| 2004/0010787 A1 | 1/2004 | Traut et al. | |
| 2006/0184935 A1 | 8/2006 | Abels et al. | |
| 2006/0184936 A1 | 8/2006 | Abels et al. | |
| 2006/0184937 A1 | 8/2006 | Abels et al. | |
| 2006/0225065 A1 | 10/2006 | Chandhok et al. | |

OTHER PUBLICATIONS

United States Patent Trademark Office, "Notice of Allowance," Dec. 26, 2007, U.S., TOL-85 Form; and allowed claims for co-pending U.S. Appl. No. 11/386,570.
VMware DiskMount Utility. User's Manual. 2005. Palo Alto, CA.
Patel, D. Sotrage File Mapping in Databases. Veritas Architect Network. 2003. Mountain View, CA.

* cited by examiner

*Primary Examiner*—Taghi T Arani
*Assistant Examiner*—Amir Mehrmanesh
(74) *Attorney, Agent, or Firm*—Brill Law Office; Jeffrey Brill

(57) ABSTRACT

A scanning manager scans the file systems of virtual machines running on a base computer. In order to scan a virtual machine, the scanning manager identifies the file on the base machine that represents the virtual machine, freezes the virtual machine, and creates a snapshot thereof. The scanning manager restarts the frozen machine, and starts the snapshot. The files of the snapshot are mapped at a virtual machine level, and the resulting file mapping information is used to scan the files of the virtual machine at a base machine level. The scanning can comprise scanning for malicious code, such as virus signatures. The scanning manager can scan one, multiple or all virtual machine(s) running on the base computer, in conjunction with a full or partial scan of the base computer, or independently.

20 Claims, 2 Drawing Sheets

SINGLE SCAN FOR A BASE MACHINE AND ALL ASSOCIATED VIRTUAL MACHINES

TECHNICAL FIELD

This invention pertains generally to virtual computing, and more specifically to scanning the file systems of a base machine and its associated virtual machines.

BACKGROUND

Consider a computer running one or more virtual machines, using virtualization software such as VMware. The base computer runs an operating system (the baseOS), and the virtualization software (e.g., VMware) runs as an application on the baseOS. An operating system runs in the virtualization environment (a guestOS) in order to form a virtual machine. The applications running in the virtual environment on the guestOS have their data organized in the form of files in the file system of the guestOS. There is typically a single file in the baseOS file system that houses all the data for the applications running in the guestOS, and the guestOS itself. Any baseOS user or application looking at the file data on the baseOS will not be able to make any sense of virtual machine data, as the guestOS file system does not necessarily write file data sequentially within the baseOS file representing a virtual machine. Instead, the data extents of the files in a guestOS are present in a seemingly random sequence in the single file on the baseOS. Therefore, an application on the baseOS cannot reorganize the file data and reconstruct the files in the guestOS environment without the help of the file system on the guestOS.

In such an environment, if anti-virus software scans the baseOS system for viruses, it does not get reliable information concerning viruses that may be in any virtual machine files on the system. Thus, even if each baseOS file representing a virtual machine is scanned and no virus signatures are found, there could still be undetected virus signatures present that are broken up and stored non-contiguously such that the baseOS file system does not recognize the different blocks as comprising contiguous data. Thus, in order to safely conclude that no viruses are present on the base machine, each virtual machine would also need to be scanned.

Individually scanning the file system of each virtual machine results in lot of work duplication and performance overhead. Each baseOS file representing a virtual machine must be scanned multiple times, once at a baseOS level, and again at a virtual machine level. The act of separately scanning the virtual machine file systems populates those file systems and the baseOS file system with scanning data. Additionally, the anti-virus scanning tool would need to be installed on each of the guestOS operating systems of the virtual machines.

What is needed are methods, computer readable media and computer systems for performing a single scan on a base machine such that all associated virtual machines can also be reliably scanned.

SUMMARY OF INVENTION

Computer-implemented methods, computer systems and computer-readable media scan the file systems of virtual machines running on a base computer. In order to scan a virtual machine, a scanning manager identifies the file on the base machine that represents the virtual machine, freezes the virtual machine, and creates a snapshot thereof. The scanning manager restarts the frozen machine, and starts the snapshot. The files of the file system of the snapshot are mapped at a virtual machine level, and the resulting file mapping information is used to scan the files of the virtual machine at a base machine level. The mapping information is current as of the instant the snapshot was taken.

The scanning can comprise scanning for malicious code, such as virus signatures. In other embodiments, the scanning comprises other types of pattern searches. The scanning manager can scan one, multiple or all virtual machine(s) running on the base computer, in conjunction with a full or partial scan of the base computer, or independently.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
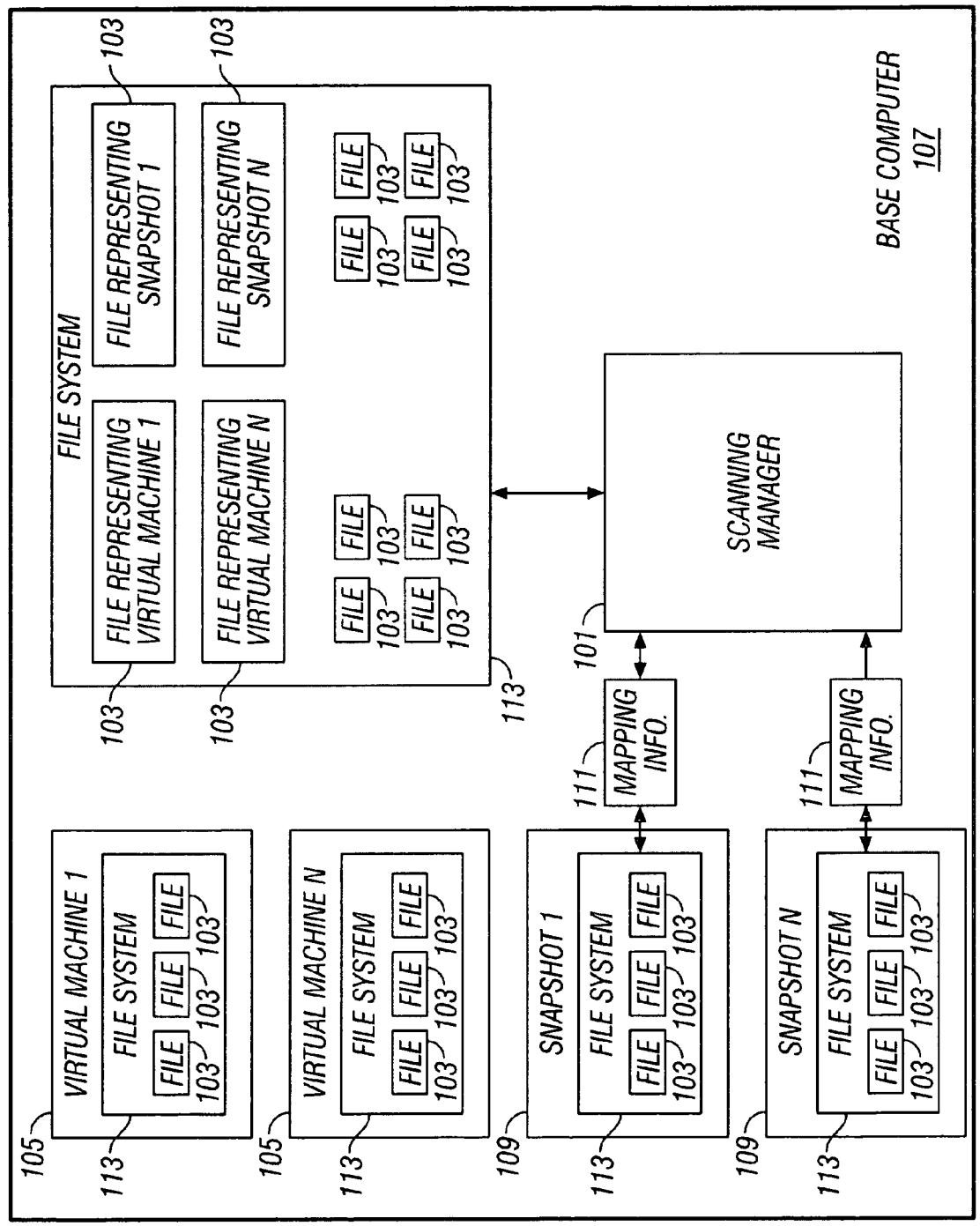
FIG. 1 is a block diagram illustrating a high level overview of a scanning manager scanning file systems of virtual machines, according to some embodiments of the present invention.

FIG. 1 illustrates a scanning manager 101, according to some embodiments of the present invention. It is to be understood that although the scanning manager 101 is illustrated as a single entity, as the term is used herein a scanning manager 101 refers to a collection of functionalities which can be implemented as software, hardware, firmware or any combination of these. Where a scanning manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the scanning manager 101 identifies the files 103 that represent the virtual machines 105 running on a base computer 107. The specific files 103 used by virtualization software to represent virtual machines 105 are known. For example, VMware publishes this information.

The scanning manager 101 freezes the virtual machines 101 by using the "suspend" or a similar feature (in VMware this feature is called "suspend;" it may have different names in other software packages). The scanning manager 101 then creates a snapshot 109 of the file 103 representing each virtual machine 105. The snapshot 109 can be a simple copy of the file 103 with a changed name and configuration (e.g., changed base VMware configuration), such that the virtual machine 105 represented by the snapshot 109 can be started.

Following is an example procedure for creating a snapshot 109 for a VMware virtual machine 105, according to one embodiment of the present invention. In the following example, the virtual machine is represented by "Virtual 01", and "Virtual 03" represents the created snapshot 109 thereof. This example is for a base machine 107 running the Linux operating system, and includes implementation specific Linux commands. It is to be understood that the following procedure is only an example, and many variations on this procedure will be readily apparent to those of ordinary skill in the relevant art in light of this specification.

1. Create a new directory:
cd/var/lib/vmware/Virtual\Machines
mkdir "Virtual 03"

2. Copy the files 103 to the new directory. The following scripting changes filename components as desired, in this case changing the "01" and "03". When using such scripting, it is important to watch the direction of the quotation marks.
for F in Virtual\01/*
>do
>cp-av "$F" "`echo $F|sed 's/Virtual 01/Virtual 03/g'`"
>done 3. Change the first of two files 103 that specify the disk images:
cd Virtual\03
vi Virtual\03.vmdk 4. Globally change "Virtual 01" to "Virtual 03" by typing:
:%s/Virtual 01/Virtual 03/g
Save your changes and exit the editor.

5. Edit the other file 103:
vi Virtual\03.vmx.
Globally change "Virtual 01" to "Virtual 03" by typing:
:%s/Virtual 01/Virtual 03/g 6. Delete the write-lock file, if it exists:
rm Virtual\03.vmdk.WRITELOCK 7. Edit the file /etc/vmware/vm-list to add the line:
config "/var/lib/vmware/Virtual Machines/Virtual 03/Virtual 03.vmx"

The scanning manager 101 can restart the frozen virtual machines 105, once the snapshots 109 have been created.

The scanning manager 101 starts the snapshot virtual machines 105, and uses a file mapping methodology to create mapping information 111 for the files 103 of the file systems 113 of the virtual machines 105. Such mapping information 113 typically includes the data extent location for the files 103 on the storage device. In the case of a file system 113 of a virtual machine 105, the storage device is not a physical medium, but instead the file 103 in the file system 113 of the base computer 107 that represents the virtual machine 105. The mapping information 111 reflects the state of the file system 113 at the time the snapshot 109 was taken. Thus, the virtual machine 105 files 103 subsequently scanned are guaranteed to be current as of the instant when the snapshot 109 was taken.

Figure 2:
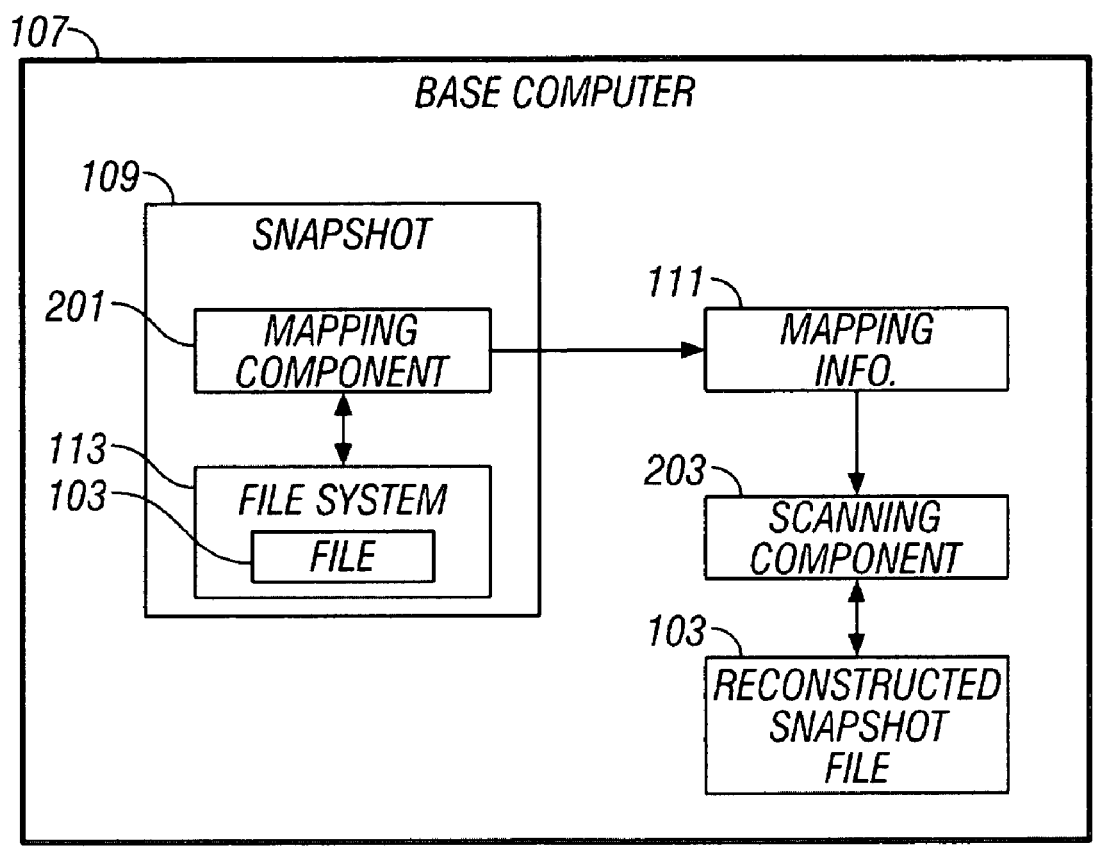
FIG. 2 is a block diagram illustrating mapping file system information at a virtual machine level and scanning the corresponding files at a base computer level, according to some embodiments of the present invention.

As illustrated in FIG. 2, the file system 113 of a virtual machine 105 is mapped at a guestOS level (e.g., by a mapping component 201 of the scanning manager 101 running as a process on the virtual computer 105). Thus, the mapping component 201 gleans mapping information 113 concerning the locations of the files 103 of the file system 113 of the virtual machine 105 on their storage medium, which in this case is the single file 103 in the file system 113 of the base computer 107 that represents the virtual machine.

The mapping information 113 is communicated to a baseOS component of the scanning manager 101 (e.g., a scanning component 203 running as a process of the base computer 107). This communication can be executed via network protocol. Note that the mapping information 113 is very small compared to the actual files 103. Additionally, as the transfer occurs between the guestOS and the baseOS on the same physical base computer 107, there is no actual traffic on the external network. Once the mapping information 113 has been gleaned and transmitted, the snapshot 109 can be shutdown.

Techniques for file mapping are known to those of ordinary skill in the relevant art, and the implementation mechanics for file mapping within the context of the current invention will be readily apparent to those of ordinary skill in the relevant art, in light of this specification.

Returning to FIG. 1, the scanning manager 101 uses the mapping information 113 to reorganize the data representing the files 103 of each virtual machine 105 at a base machine 107 level. For example, the scanning manager 101 can use the mapping information 113 to reconstruct the files 103 of a virtual machine 105, e.g., in the memory of the base machine 107.

The scanning manager 101 then scans the files 103 of virtual machines 105 at a base machine 105 level. The scanning can comprise scanning for malicious code (e.g., virus) signatures, but in other embodiments comprises other types of pattern searches. Anti-virus scanning is just an example.

It is to be understood that the scanning manager can use the above described methodology to scan one, multiple or all virtual machine(s) 105 running on the base computer 107, in conjunction with a full or partial scan of the base computer 107, or independently.

In different embodiments of the present invention, the scanning manager 101 scans file systems 113 of virtual machines 105 that are implemented by various virtual machine packages having the "freeze", "snapshot" and "resume" capabilities. VMware is just an example.

As will be understood by those familiar with the art, the invention may be embodied in other specific forms without departing from the spirit or essential characteristics thereof. Likewise, the particular naming and division of the modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as program codes. As will be readily apparent to one of ordinary skill in the relevant art, any form of computer readable storage medium can be used in this context, such as magnetic or optical storage media, such that when the program codes stored on a computer readable medium are executed by a computer processor of a computing device, the computing device executes their associated functionality. As used herein, the term "computer readable storage medium" does not mean an electrical signal separate from an underlying physical medium. Additionally, as will be readily apparent to one of ordinary skill in the relevant art, software portions of the present invention can be instantiated (for example as object code or executable images) within the memory of any programmable computing device, such that when the processor of the computing device processes the components, the computing device executes their associated functionality. It will be further readily apparent to those of ordinary skill in the relevant art that the terms "computer system" and "computing device" means one or more computers configured and/or programmed to execute the described functionality. Accordingly, the disclosure of the present invention is intended to be illustrative, but not limiting, of the scope of the invention, which is set forth in the following claims.

What is claimed is:

1. A computer implemented method for scanning virtual machines running on a base computer, the method comprising the steps of:
    freezing at least one virtual machine running on the base computer;
    creating a snapshot of at least one file representing the at least one frozen virtual machine;
    starting at least one snapshot of the at least one virtual machine;
    mapping files of at least one snapshot of the at least one virtual machine; and
    using file mapping information to scan the files of the at least one virtual machine.

2. The method of claim 1 wherein:
    the steps of claim 1 are performed for each virtual machine running on the base computer.

3. The method of claim 2 further comprising:
    scanning files of the base computer.

4. The method of claim 1 further comprising:
    identifying at least one file that represents the at least one virtual machine running on the base computer.

5. The method of claim 1 wherein the mapping step is performed at a virtual machine level and the scanning step is performed at a base computer level, the method further comprising:
    communicating file mapping information from at least one mapping component running at the virtual machine level to a scanning component running at the base computer level.

6. The method of claim 1 wherein using file mapping information to scan the files of the at least one virtual machine further comprises:
    using file mapping information to reconstruct the files of the at least one virtual machine at a base machine level; and
    scanning the reconstructed files.

7. The method of claim 1 wherein:
    the base computer comprises a virtual machine running on a physical computer.

8. The method of claim 1 wherein scanning further comprises:
    scanning for signatures identifying malicious code.

9. A non-transitory computer readable medium containing a computer program product for scanning virtual machines running on a base computer, the computer program product comprising:
    program code for freezing at least one virtual machine running on the base computer;
    program code for creating a snapshot of at least one file representing at least one frozen virtual machine; program code for starting at least one snapshot of at least one virtual machine; program code for mapping files of at least one snapshot of at least one virtual machine; and program code for using file mapping information to scan the files of at least one virtual machine.

10. The non-transitory computer readable medium of claim 9 further comprising: program code for scanning files of the base computer.

11. The non-transitory computer readable medium of claim 9 further comprising:
    program code for identifying at least one file that represents the at least one virtual machine running on the base computer.

12. The non-transitory computer readable medium of claim 9 further comprising:
    program code for communicating file mapping information from at least one mapping component running at a virtual machine level to a scanning component running at a base computer level.

13. The non-transitory computer readable medium of claim 9 wherein the program code for using file mapping information to scan the files of the at least one virtual machine further comprises:
    program code for using file mapping information to reconstruct the files of the at least one virtual machine at a base machine level; and
    program code for scanning the reconstructed files.

14. The non-transitory computer readable medium of claim 9 further comprising:
    program code for scanning for signatures identifying malicious code.

15. A computer system, in computer memory, for scanning virtual machines running on a base computer, the computer system comprising:
    a software portion running on the base computer configured to freeze at least one virtual machine running on the base computer;
    a software portion running on the base computer configured to create a snapshot of at least one file representing at least one frozen virtual machine;
    a software portion running on the base computer configured to start at least one snapshot of the at least one virtual machine;
    a software portion running on the base computer configured to map files of at least one snapshot of the at least one virtual machine;
    a software portion running on the base computer configured to use file mapping information to scan the files of the at least one virtual machine.

16. The computer system of claim 15 further comprising:
    a software portion running on the base computer configured to scan files of the base computer.

17. The computer system of claim 15 further comprising:
    a software portion running on the base computer configured to identify at least one file that represents the at least one virtual machine running on the base computer.

18. The computer system of claim 15 further comprising:
    a software portion running on the base computer configured to communicate file mapping information from at least one mapping component running at a virtual machine level to a scanning component running at the base computer level.

19. The computer system of claim 15 wherein the software portion running on the base computer configured to use file mapping information to scan the files of the at least one virtual machine is further configured to:

use file mapping information to reconstruct the files of the at least one virtual machine at a base machine level; and 6 scan the reconstructed files.

20. The computer system of claim 15 further comprising:
a software portion running on the base computer configured to scan for signatures identifying malicious code.

* * * * *